May 30, 1933.  R. H. UHLEMANN  1,912,107
MEASURING INSTRUMENT
Filed Aug. 30, 1930
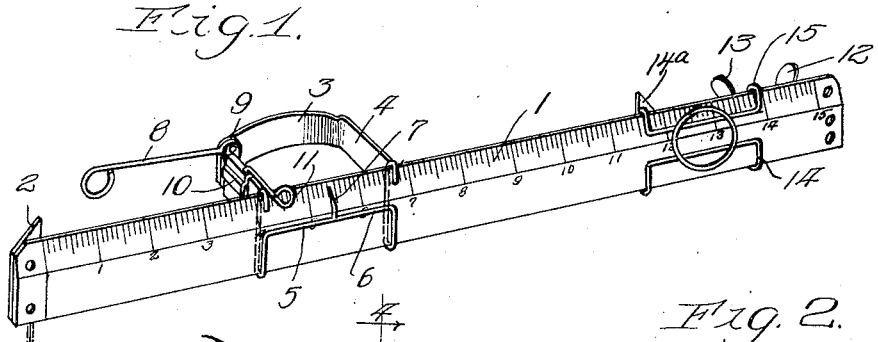
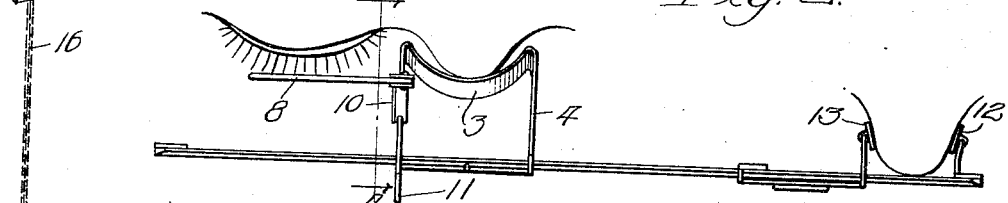
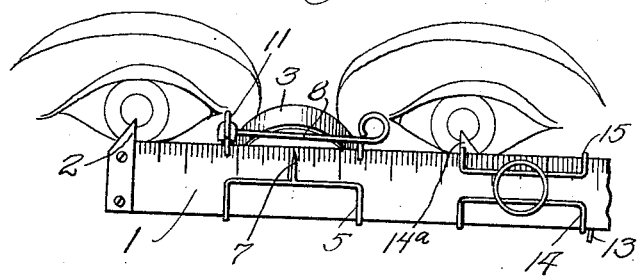
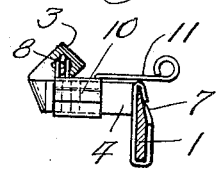
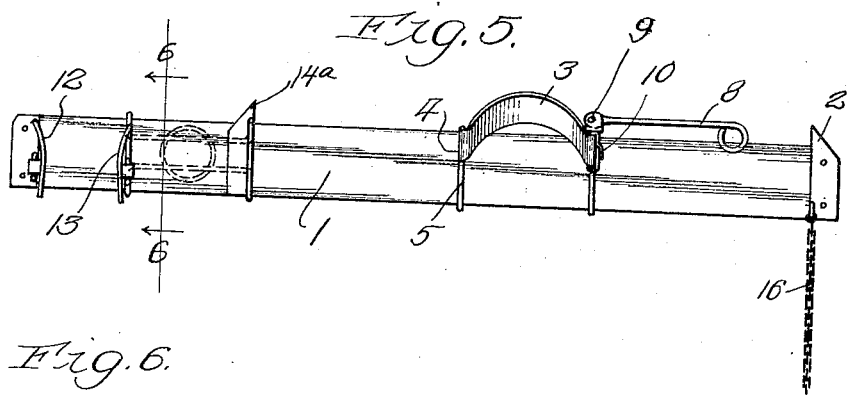
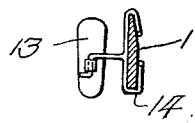
Inventor:
Richard H. Uhlemann,
By
Jones, Addington, Ames & Seibold Attys.

Patented May 30, 1933

1,912,107

UNITED STATES PATENT OFFICE

RICHARD H. UHLEMANN, OF WINNETKA, ILLINOIS

MEASURING INSTRUMENT

Application filed August 30, 1930. Serial No. 478,900.

This invention relates to a measuring instrument and has special reference to an instrument for making the various measurements required in fitting eye-glasses, and the like.

More particularly, this invention relates to a measuring instrument comprising a scale having a nose bridge-engaging member, a sight member, nose-engaging guards or plaquets and a flexible member, all mounted on the scale.

An object of this invention is to provide a measuring instrument for making the various measurements required in fitting spectacles or eye-glasses to a patient.

A further object of this invention is to provide a simple, compact measuring device of the type referred to above.

Further objects and advantages of the present invention will be apparent from the following description when taken together with the accompanying drawing, in which latter:

Figure 1 is a perspective view of a measuring instrument embodying the present invention;

Fig. 2 is a top plan view of the measuring instrument;

Fig. 3 is a front elevational view of a portion of the measuring instrument showing the nose-bridge-engaging member adjusted with respect to the sight members for measuring the total distance between the pupils of the eyes and the distance from the center of the bridge to the center of each pupil simultaneously.

Fig. 4 is an elevational view, partially in cross section, taken on the line 4—4 of Fig. 2;

Fig. 5 is a rear elevational view of the measuring instrument, and

Fig. 6 is a rear elevational view of a guard mounted on the scale partially in section, taken on the line 6—6 of Fig. 5.

Referring more particularly to the drawing, the construction shown comprises a scale 1 having a pointed sight member 2 mounted on one end so that the point of the sight member is directly in line with the zero point on the scale. The nose bridge-engaging member 3, having supporting arms 4 is attached to a member 5 slidably mounted on the scale 1. The member 5, although it may be of any desirable form, is preferably made from a U-shaped member which is bent about the scale 1, as shown particularly in Figs. 1 and 3, with the cross member 6 positioned on the side of the scale opposite the nose bridge-engaging member 3, which will be hereinafter referred to as the front side of the scale. Midway between the sides of the slidably mounted member 5, a pointer 7 is mounted. The pointer 7 is in fore-and-aft alignment with the center of the nose bridge-engaging member. The sight member 2 and the nose bridge-engaging member 3 are adapted to cooperate in measuring the distance from the center of the nose bridge-engaging member to the middle of the lens. The nose bridge-engaging member is positioned over the bridge of the nose of the patient, with the point of the sight member in fore-and-aft alignment with the center of the eye. It is then only necessary to read the portion of the scale indicated by the pointer 7 in order to get the correct reading for this measurement.

In order to position the lens with respect to the nose bridge-engaging member so that the lens will be at a proper distance from the eye of the patient, an arm 8 is slidably mounted on one of the supporting arms 4 of the nose bridge-engaging member 3. The arm 8 is pivotally mounted at 9 to a collar portion 10 which is adapted to slide along the supporting member 4. The supporting member 4, upon which the collar 10 is mounted, is marked off to form a scale so that when the nose bridge-engaging member is properly positioned upon the nose of the patient and the arm is pivoted outwardly, as shown in Figs. 1, 2 and 5, and positioned at a proper distance from the eye of the patient, the reading on the scale may be taken. A handle member 11 is connected to the upper end of the collar 10 and is adapted to be used in sliding the collar 10 backwardly and forwardly.

A nose guard or plaquet 12 is preferably fixedly mounted on the end of the scale opposite from the sight member 2. The guard 12 is adapted to cooperate with a second plaquet or guard 13 slidably mounted on the scale 1 by means of the slidable member 14 which is preferably made from one piece of material and is bent about the scale member, as shown in Fig. 1, so that the plaquet or guard 13 is only capable of moving longitudinally of the scale. The end 15 of the slidably mounted member 14 is formed as a pointer which is in fore-and-aft alignment with the nose-engaging plaquet or guard 13. By this means, when the guards 12 and 13 are properly positioned on each side of the nose of the patient, the required distance between the guards is clearly shown by the pointer 15.

A second pointed sight member 14a similar to the sight member 2 is mounted on the end of the slidable member 14 nearest to the nose bridge engaging member 3. By positioning the two sight members 2 and 14a in fore and aft alignment with the pupils of the eyes of the patient when the nose bridge engaging member 3 is positioned on the nose, the distance from the center of the bridge to the pupil of each eye may be simultaneously obtained from readings on the scale 1.

A flexible member 16, which may be a fine wire chain, is attached to the scale 1 at the zero point thereof for measuring the length of the temple. To obtain this measurement, the scale is placed in proper position with respect to the eye of the patient and the flexible member 16 placed about the ear, after which the flexible member is positioned along the scale and the reading taken.

With the above-described measuring instrument, a simple, compact device results, by which the various measurements necessary in fitting glasses to a patient may be quickly and accurately taken.

While I have shown and described but one embodiment of this invention, it will be apparent to those skilled in the art that various modifications thereof may be made without departing from the spirit and scope of the invention, and, therefore, I wish to be limited only by the scope of the prior art and the appended claims.

I claim:

1. A measuring instrument for determining the measurements for eye-glasses and the like, comprising a scale, a sight member mounted on the scale for sighting at the pupil, a nose bridge engaging member mounted on said scale adapted to straddle the bridge of the nose, a pointer cooperating with the scale and carried by and centrally positioned with respect to the nose bridge engaging member, said instrument having provision for effecting relative adjustment of the sight member and the nose engaging member along the scale whereby the required distance from the center of the bridge to the center of the lens may be obtained, and means carried by and cooperating with said nose bridge engaging member for locating the position of the lens to be employed with respect to the nose bridge engaging member so that the lens will be at a proper distance from the eye while in use.

2. A measuring instrument for determining the measurements for eye-glasses and the like comprising a scale, a nose bridge engaging member mounted on said scale, and a member slidably mounted on said nose bridge engaging member and movable backwardly and forwardly with respect thereto for locating the position of the lens to be employed with respect to the nose bridge engaging member so that the lens will be at a proper distance from the eye while in use.

3. A measuring instrument for determining the measurements for eye-glasses and the like comprising a scale, a nose bridge engaging member adapted to straddle the bridge of the nose and having a side supporting member mounted on said scale, and an arm slidably mounted on said supporting member and extending at right angles thereto for locating the position of the lens to be employed with respect to the nose bridge engaging member so that the lens will be at a proper distance from the eye while in use.

4. A measuring instrument for determining the measurements for eye-glasses and the like comprising a scale, a nose bridge engaging member adapted to straddle the bridge of the nose and having a side supporting member mounted on said scale, said supporting member being marked to form a scale, and an arm slidably and pivotally mounted on said supporting member and adapted to be pivoted about said supporting member in a plane at right angles thereto for locating the position of the lens to be employed with respect to the nose bridge engaging member so that the lens will be at a proper distance from the eye while in use.

5. A measuring instrument for determining the measurements for eye-glasses and the like, comprising a scale, a pair of sight members mounted on the scale for sighting at the pupils, a nose bridge engaging member adapted to straddle the bridge of the nose mounted on said scale between said sight members, and a pointer cooperating with the scale and centrally positioned with respect to the nose engaging member and mounted thereon, said instrument having provision for effecting relative adjustment of the sight members and the nose bridge engaging member along the scale whereby the required distance from the center of the bridge to the center of the lens may be obtained.

In witness whereof, I have hereunto subscribed my name.

R. H. UHLEMANN.